United States Patent
Murphy et al.

(10) Patent No.: US 10,664,990 B2
(45) Date of Patent: May 26, 2020

(54) MODULAR VIRTUAL REALITY TRACKING SYSTEM FOR A GAME CONSOLE PLAY AREA

(71) Applicant: Sony Interactive Entertainment LLC, San Mateo, CA (US)

(72) Inventors: Kevin Murphy, Los Angeles, CA (US); Troy Hieda, Los Angeles, CA (US); Stephen Burns, Culver City, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 111 days.

(21) Appl. No.: 15/714,943

(22) Filed: Sep. 25, 2017

(65) Prior Publication Data

US 2019/0096087 A1 Mar. 28, 2019

(51) Int. Cl.

| G06K 9/00 | (2006.01) |
|---|---|
| G06T 7/73 | (2017.01) |
| G06T 7/246 | (2017.01) |
| G06T 7/55 | (2017.01) |
| A63F 13/25 | (2014.01) |
| A63F 13/525 | (2014.01) |
| G06T 7/90 | (2017.01) |
| G06T 7/292 | (2017.01) |

(52) U.S. Cl.
CPC ............... *G06T 7/74* (2017.01); *A63F 13/25* (2014.09); *A63F 13/525* (2014.09); *G06T 7/246* (2017.01); *G06T 7/248* (2017.01); *G06T 7/55* (2017.01); *A63F 2300/8082* (2013.01); *G06T 7/292* (2017.01); *G06T 7/90* (2017.01); *G06T 2207/10016* (2013.01); *G06T 2207/10024* (2013.01); *G06T 2207/20221* (2013.01)

(58) Field of Classification Search
CPC .................. A63F 13/25; A63F 13/525; A63F 2300/8082; G06T 7/55; G06T 7/248; G06T 7/292; G06T 7/90; G06T 7/74; G06T 2207/20221
See application file for complete search history.

(56) References Cited

U.S. PATENT DOCUMENTS

| 9,389,699 B2 * | 7/2016 | Bailey | G06F 3/017 |
|---|---|---|---|
| 10,019,806 B2 * | 7/2018 | Perry | G06T 7/292 |
| 2013/0072297 A1 * | 3/2013 | Seegers | A63F 13/06 463/31 |

* cited by examiner

*Primary Examiner* — Shefali D Goradia
(74) *Attorney, Agent, or Firm* — Carr & Ferrell LLP

(57) ABSTRACT

The disclosure provides methods and systems for modular virtual reality tracking of an object in a play area. An example system includes a first tracking module located at a first place and configured to capture a first image of a play area and obtain first coordinates of the object relative to the first place. The system may include at least one second tracking module located at a second place different from the first place and configured to capture a second image of the play area and obtain second coordinates of the object relative to the second place. The system may include a processing unit configured to receive the first coordinates from the first tracking unit and the second coordinates from the second tracking unit and continuously track the object while the object is within the boundaries of at least one of the first image and the second image.

20 Claims, 6 Drawing Sheets

MODULAR VIRTUAL REALITY TRACKING SYSTEM FOR A GAME CONSOLE PLAY AREA

TECHNICAL FIELD

This disclosure relates generally to virtual reality systems, and more particularly, to modular virtual reality tracking systems for a game console play area.

DESCRIPTION OF RELATED ART

The approaches described in this section could be pursued, but are not necessarily approaches that have previously been conceived or pursued. Therefore, unless otherwise indicated, it should not be assumed that any of the approaches described in this section qualify as prior art merely by virtue of their inclusion in this section.

Virtual reality tracking is a rapidly growing field. Existing virtual reality tracking devices may track the location and movements of a user and recognize gestures of the user. However, the existing virtual reality tracking devices may be limited to tracking an object within an area of a limited size and/or a predetermined configuration. A possible solution that increases the size of the play area to be tracked may entail adding more image sensors to the virtual reality tracking devices. Processing images captured by the additional image sensors may require an increase in the power of the processors of the virtual reality tracking devices and upgrading software applications.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

Generally, the present disclosure is directed to the technology for modular virtual reality tracking. Some embodiments of the present disclosure may allow using multiple tracking modules arranged at different places around a play area for capturing images. The images can be used to identify and track an object in the play area. The object can be tracked in situations when the object is outside of the view of some tracking modules but captured by at least one of the tracking modules.

According to one aspect of the present disclosure, provided is a system for modular virtual reality tracking. The system may include a first tracking module configured to capture a first image of a play area. The first module can be located at a first place. The play area may include at least one object. The first tracking module can be further configured to analyze the first image in order to obtain first coordinates of the object. The first coordinates can be associated with the first place. The system may include at least one second tracking module located at a second place and configured to capture a second image of the play area. The second place may differ from the first place. The second tracking module can be further configured to analyze the second image to obtain second coordinates of the object. The second coordinates can be associated with the second place. The system may further include a processing unit. The processing unit can be communicatively coupled to the first tracking module and the at least one second tracking module. The processing unit can be configured to receive the first coordinates and the second coordinates. The processing unit can be further configured to continuously track, based at least on one of the first coordinates and the second coordinates, the at least one object in the play area while the object is within boundaries of at least one of the first image or the second image.

In some embodiments, the processing unit can be further configured to determine, based at least on the first coordinates and the second coordinates, a location and an orientation of the at least one second tracking module relative to the first tracking module.

The processing unit may be further configured to determine, based at least on the first coordinates and the second coordinates, a transformation matrix for translating the second coordinates into the first coordinates.

In some embodiments, the processing unit can be further configured to transform at least one point of the second image into at least one further point of the first image using the transformation matrix.

The processing unit can be further configured to determine that at least three first points (A1, A2, A3) in the first image and at least three second points (B1, B2, B3) in the second image represent the same three points of the at least one object in the play area. The processing unit can be further configured to associate an identity matrix with the at least one second tracking module. The processing unit can be further configured to apply at least one operation to the identity matrix and by doing so obtain the transformation matrix, wherein coordinates (B1, B2, B3) are translated to coordinates of (A1, A2, A3) using the transformation matrix.

The operation may be applied to the identity matrix includes a translation to align B1 to A1, a first rotation around B1 to align B2 to A2, and a second rotation around an axis between B1 and B2 to align B3 to A3.

In some embodiments, the determination that (A1, A2, A3) and (B1, B2, B3) represent the same three points of the at least one object can be based on matching colors of the at least three first points and the at least three second points.

The determination that (A1, A2, A3) and (B1, B2, B3) represent the same three points of the at least one object can be based on matching movements of the at least three first points and the at least three second points.

In some embodiments, the determination that (A1, A2, A3) and (B1, B2, B3) represent the same three points of the at least one object can be based on matching relative positions of the at least three first points and the at least three second points.

In various embodiments, one of the first tracking modules and the at least one second tracking module may include one of the following: a PlayStation and a smartphone.

According to another aspect of the present disclosure, provided is a method for modular virtual reality tracking. The method may include capturing, by a first tracking module, a first image of the play area, the play area including at least one object. The first tracking module can be located at a first place. The method may further include analyzing, by the first tracking module, the first image to obtain first coordinates of the object. The first coordinates can be associated with the first place. The method may further include capturing, by at least one second tracking module, a second image of the play area. The second tracking module can be located at second place which is different from the first place. The method may further include analyzing, by the at least one second module, the second image to obtain second coordinates of the object. The second coordinates can be associated with the second place. The method may further include receiving, by a processing unit communicatively coupled to the first tracking module and the at least one second tracking module, the first coordinates and the second coordinates. The method may further include continuously tracking, by the processing unit and based at least on one of the first coordinates and the second coordinates, the object in the play area while the object is within boundaries of at least one of the first image or the second image.

In further embodiments, the method steps are stored on a machine-readable medium comprising instructions, which when implemented by one or more processors perform the steps. In yet further example embodiments, hardware systems or devices can be adapted to perform the recited steps. Other features, examples, and embodiments are described below.

BRIEF DESCRIPTION OF THE DRAWINGS

Embodiments are illustrated by way of example, and not by limitation in the figures of the accompanying drawings, in which like references indicate similar elements.

DETAILED DESCRIPTION

Figure 1:
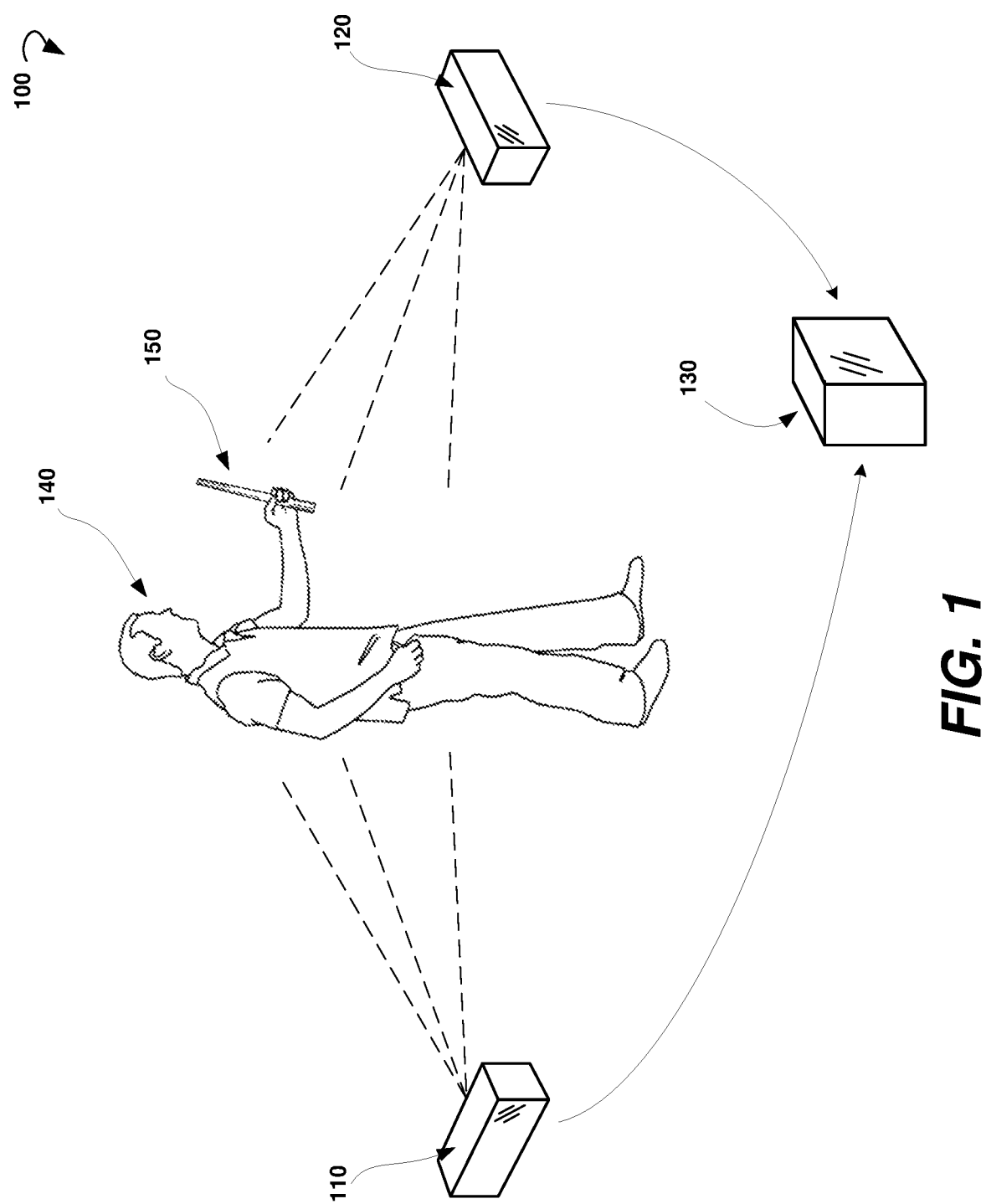
FIG. 1 is a block diagram showing an example system suitable for implementation of various aspects of embodiments, in accordance with an embodiment of the disclosure.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein can be implemented using a variety of technologies. For example, the methods described herein are implemented in software executing on a computer system or in hardware utilizing either a combination of microprocessors or other specially designed application-specific integrated circuits (ASICs), programmable logic devices, or various combinations thereof. In particular, the methods described herein are implemented by a series of computer-executable instructions residing on a storage medium such as a disk drive, or computer-readable medium. It should be noted that methods disclosed herein can be implemented by a cellular phone, smart phone, computer (e.g., a desktop computer, tablet computer, laptop computer), game console, handheld gaming device, and so forth.

In general, various embodiments of the present disclosure are directed to methods and systems for modular virtual reality tracking. The tracking can be made based on an analysis of images and/or depth data of a play area. The images and/or depth data can be obtained from image sensor(s) of at least two tracking modules. Various embodiments of the present disclosure may allow identification of an object in a play area. Various embodiments may further allow tracking the object in the play area in situations when the object leaves boundaries of an image captured by one of the tracking modules while being within boundaries of at least one more tracking module.

Further tracking modules can be added to either increase the play area by spreading the tracking modules out or to increase tracking quality by overlapping the same play area from multiple locations and angles.

According to an example embodiment, a method for modular virtual reality tracking may include capturing, by a first tracking module located at a first place, a first image of the play area. The method may further include analyzing, by the first tracking module, the first image to obtain first coordinates of the object in play area. The first coordinates can be associated with the first place. The method may further include capturing, by at least one second tracking module located at second place different from the first place, a second image of the play area. The method may further include analyzing, the second image to obtained second coordinates of the object. The second coordinates can be associated with the second place. The method may further include receiving, by a processing unit communicatively coupled to the first tracking module and the at least one second tracking module, at least the first coordinates and the second coordinates of the object. The method may include continuously tracking, by the processing unit and based at least one of the first coordinates and the second coordinates, the object in the play area while the object is within boundaries of at least one of the first image or the second image.

With reference now to the drawings, FIG. 1 is an example system 100 suitable for implementation of various aspects of the present technology, in accordance with an embodiment of the disclosure. The system 100 may include a first tracking module 110, at least one second tracking module 120, and a processing unit 130.

According to embodiments of the present disclosure, the first and second tracking modules 110 and 120 can be placed at different locations and directions relative to a play area. The first tracking module 110 can be configured to capture a first image of a play area. The second tracking module 120 can be configured to capture a second image of the same play area. The first image and the second image may represent, correspondently, a first part and a second part of the play area. In some embodiments, the first part may include an overlapping area with the second part. In some embodiments, the first tracking module 110 may be configured to analyze the first image in order to obtain first coordinates of an object in the play area. The second tracking module can be configured to analyze the second image to obtain second coordinates of the same object. The first coordinates of the object can be relative to a location and a direction of the first tracking module 110. The second coordinates of the object can be relative to the location and the direction of the second tracking module 120.

In various embodiments, the first tracking module 110 and the second tracking module 120 can be communicatively coupled with the processing unit 130. The processing unit 130 may be configured to acquire, simultaneously in real time, the first coordinates of the object obtained by the first tracking module 110 and the second coordinates of the object obtained by the second tracking module 120. In certain embodiments, the processing unit 130 may also be configured to receive color data of the object and metadata of the object from both the first tracking module 110 and the second tracking module 120.

In some embodiments, the object may include a static object or a moving object present in the play area. In the example of FIG. 1, the object may include a user 140 or a controller 150. The object may include points of a skeleton of the user 140.

When the object can move within the play area, it may be out of view of either the first tracking module 110 or the second tracking module 120. In some embodiments, the processing unit 130 can be configured to determine a location of the object relative to the first tracking module 110 in a situation when the object leaves the boundaries of the first image of the play area captured by the first tracking module 110. This determination can be carried out when the following conditions are met: 1) the object is still within boundaries of the second image of the play area captured by the second tracking module 120, so that the second coordinates of the object can be determined by the second tracking module; and 2) the location of the second tracking module 120 relative to the first tracking module 110 is known or previously determined.

In various embodiments of the present disclosure, the first tracking module 110 and/or the second tracking module 120 may include a PlayStation, a game console, a smart phone, a tablet computer, a desktop or a laptop computer equipped with a web camera, and the like.

In various embodiments, the processing unit 130 may include hardware (e.g., dedicated logic, programmable logic, and microcode), software (such as software run on a general-purpose computer system or a dedicated machine), or a combination of both. In some example embodiments, the processing unit 130 may reside at the play area. In another example embodiment, the processing unit 130 may reside at a remote place.

Figure 2:
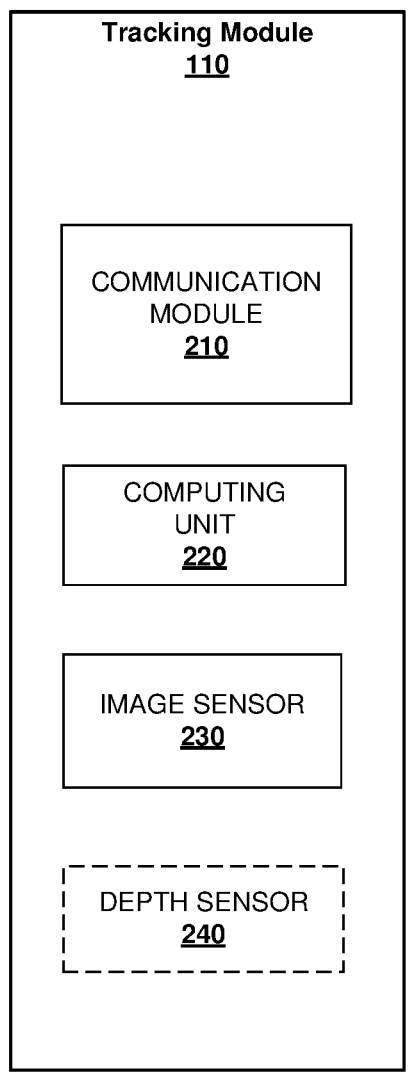
FIG. 2 is a block diagram showing components of an example tracking module, in accordance with some embodiments of the disclosure.

FIG. 2 is a block diagram showing components of an example first tracking module 110 (or at least one second tracking module 120) suitable for employing methods for modular virtual reality tracking, according to some embodiments of the disclosure.

The first tracking module 110 may include a communication module 210, a computing unit 220, and an image sensor 230. In some embodiments, the first tracking module 110 may also include a depth sensor 240.

In certain embodiments, the image sensor 230 is a device that converts an optical image into an electronic signal. The image sensor 230 may include, for instance, one or more video cameras that are sensitive to the visual range, infrared (1R) cameras sensitive in one of the IR bands, (ultraviolet) UV cameras or other direct or indirect image-generating sensor systems (for example, radar or laser radar (lidar)).

In certain embodiments, the depth sensor 240 may be configured to capture video data in 3D under any ambient light conditions. The sensing range of the depth sensor 240 can be adjustable and automatically calibrated based on a physical environment and accommodating for the presence of furniture or other obstacles. Images from the depth sensor 240 and the image sensor 230 can be combined by data fusion.

In certain embodiments, the computing unit 220 is configured to process images of the play area received from the image sensor 230 and/or the depth sensor 240 to obtain data according to a pre-determined format. The data may include coordinates of points in the images of the play area and, optionally, color of points in the images of the play area The communication module 210 may be configured to operatively communicate with the processing unit 130 shown in FIG. 1. In certain embodiments, the communication module 210 is configured to transmit data related to the images of a play area captured by the image sensor 230 and/or the depth sensor 240 to the processing unit 130. The data may include the coordinates and/or of points in the images.

Figure 3:
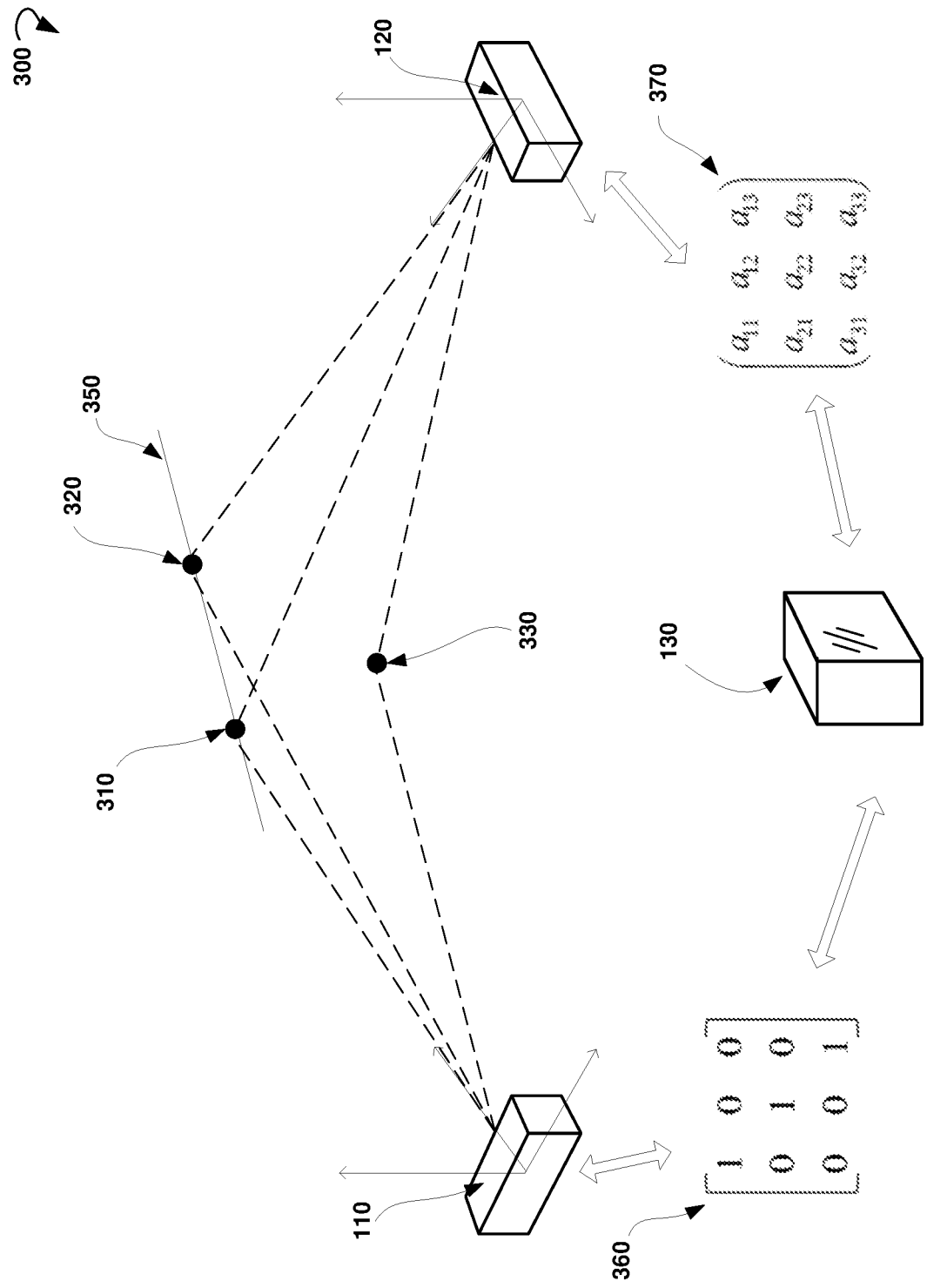
FIG. 3 is a schematic showing a mechanism for calibration of tracking modules, in accordance with an embodiment of the disclosure.

FIG. 3 is a schematic showing a mechanism for calibrating of tracking modules 300, according to some example embodiments. In some embodiments, upon receiving the data related to the first image of the play area from the first module 110 and data related to the at least one second image of the play area from at least one second module 120, the processing unit 130 may be configured to couple the first tracking module 110 and at least the second tracking module 120. The processing unit 130 may be configured to assign the first tracking module 110 as a master module and the second tracking module as an assisting module. In some embodiments, the processing unit 130 is configured to determine location and orientation of the second tracking module 120 relative to location of the first tracking module 110. For example, the processing unit 130 may be configured to determine a transformation matrix for translating coordinates of a point relative to the second tracking module to coordinates relative to the first tracking module.

In various embodiments, the processing unit 130 may be configured to analyze the data related to the first image captured by the first tracking module 110 and the data related to the at least one second image captured by at least one second tracking module 120 to identify at least three common points 310, 320, and 330. In some embodiments, the common points 310, 320, and 330 may belong to the same object in the play area. In certain embodiments, the identification may be based on a color of the points. For example, when tracking movement of a controller with a light ball, the first and second tracking modules 110 and 120 can be configured to report the color of the light ball to the processing unit 130. This may provide processing unit 130 enough information to determine if the first and second tracking modules 110 and 120 are reporting the same object.

In some embodiments, if color based identification is not available, the identification of common points can be based on comparison of movement of the points over time in the images reported by the first tracking module 110 and at least one second tracking module 120.

If a skeletal tracking is being performed, the identification of common points may be based on locations and orientations of the skeletal joints in the data of images reported by the first tracking module 110 and at least one second tracking module 120. The locations and orientations of the skeletal joints should be unique enough to differentiate between two skeletons.

After identifying at least three common points 310, 320, and 330, the processing unit 130 can be further configured to determine location and orientation of the first and second tracking modules 110 and 120 relative to each other.

In some embodiments, the processing unit 130 may be configured to assign a first matrix 360 (also referred to as first identity matrix 360) to the first tracking module 110 and a second matrix 370 (also referred to as second identity matrix 370) to the at least one second tracking module 120. The first matrix 360 and the second matrix 370 can be initially assigned the same values.

The second matrix 370 can be further transformed so that the coordinates of first common point 310 reported by the second tracking module 120 are aligned to the coordinates of the first common point 310 as reported by the first tracking module 110 when the second matrix 370 is applied to the coordinates of the points relative to the second tracking module 120.

The second matrix 370 can be further rotated around the first common point 310 so that the coordinates of the second common point 320 as reported by the second tracking module 120 are aligned to the coordinates of the second common point 320 as reported by the first tracking module 110 when the second matrix 370 is applied to the coordinates of the points relative to the second tracking module 120.

The second matrix 370 can be further rotated around an axis 350 drawn from the first common point 310 and the second common point 320 so the coordinates of the third common point 330 as reported by the second tracking module 120 are aligned to the coordinates of the third common point 330 when the second matrix 370 is applied to the coordinates of the points relative to the second tracking module 120.

In some embodiments, additional common points can be used to increase the robustness of the calibration of the tracking modules.

Once the first tracking module 110 and the at least one second tracking module 120 are calibrated, the processing unit can be configured to translate coordinates of points of a tracked object as reported by at least one second module 120 to coordinates associated with the first tracking module 110. In this way, the location of the tracked object in the play area can be determined relative to the first tracking module 110 (the main tracking module) when the tracked object leaves the view of the first racking module 110 but is still in view of at least one of the second tracking module 120 (the assisting tracking module).

In some embodiments, the selection of the main tracking module can be based on a time of arrival of images from the tracking modules to the processing unit 130 (that is, which of the tracking modules registers first). In some further embodiments, when registering, the tracking modules can be configured to send the boundaries of tracking areas to the processing unit 130. The processing unit 130 can be configured to, for example, select the main tracking module based on boundaries of the tracking area of the tracking modules.

Figure 4:
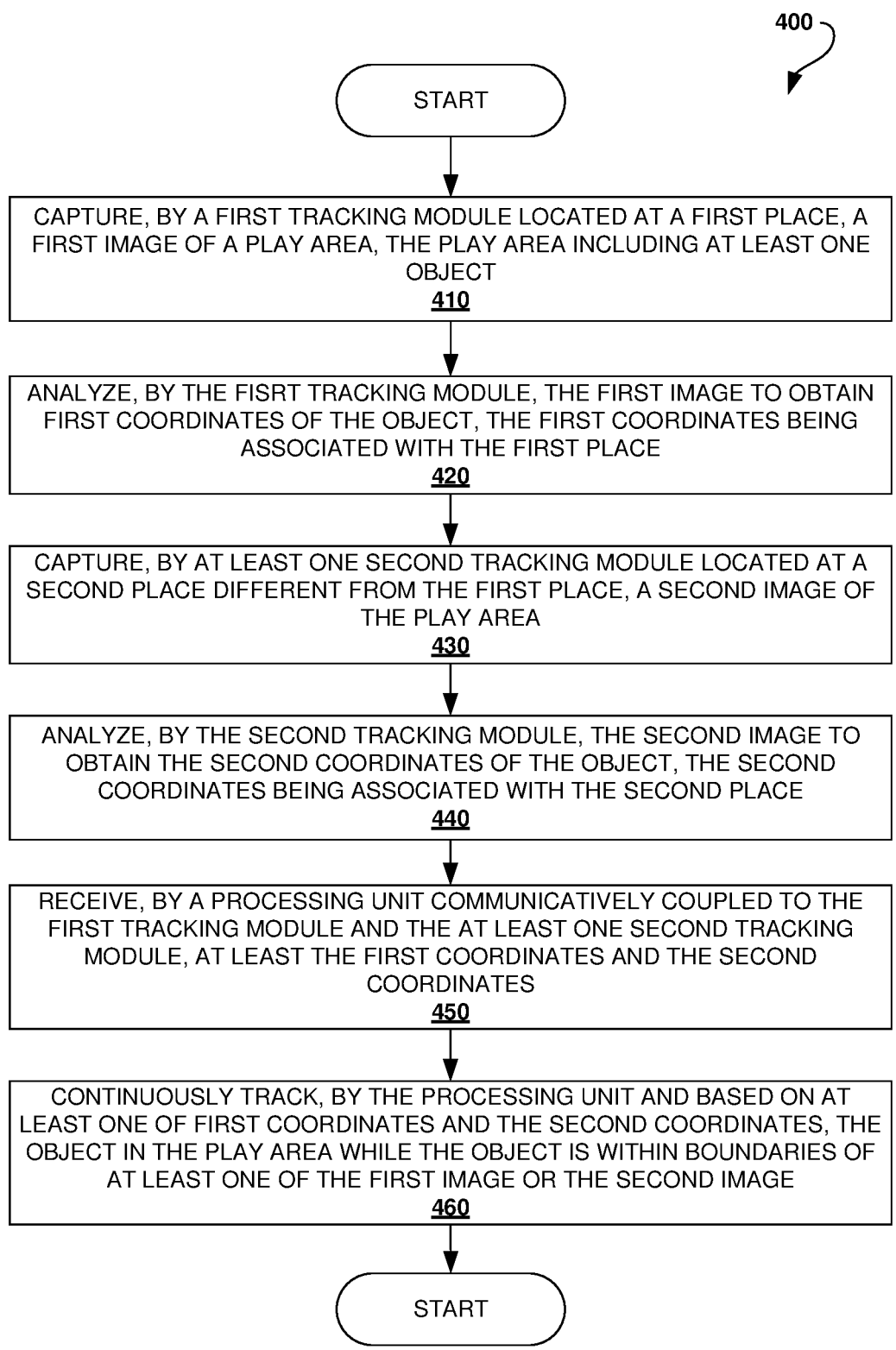
FIG. 4 is a flow chart showing a method for modular virtual reality tracking, in accordance with an embodiment of the disclosure.

FIG. 4 is a flow chart showing a method 400 for modular virtual reality tracking, according to an example embodiment. The method 400 can be implemented by elements of system 100 shown in FIG. 1.

The method 400 may commence in block 410, with capturing, by the first tracking module 110, a first image of a play area. The play area may include at least one object. The first tracking module 110 can be located at a first place.

In block 420, the method 400 may proceed with analyzing, by the first tracking module 110, the first image to obtain first coordinates of the at least one object in the play area. The first coordinates can be associated with the first place.

In block 430, the method 400 may include capturing, by at least one second tracking module 120, a second image of the play area. The second tracking module can be located at a second place. The location of the second tracking module 120 may be different from the location of the first tracking module 110.

In block 440, the method 400 may proceed with analyzing, by the at least one second tracking module 120, the second image to obtain second coordinates of the at least one object in the play area. The second coordinates can be associated with the second place, therefore, the first tracking module 110 and the second tracking module 120 may provide coordinates of the at least one object in the play area from different locations and directions.

In block 450, the method 400 may include receiving, by the processing unit 130 communicatively coupled to the first tracking module 110 and the second tracking module 120, at least the first coordinates and the second coordinates of the at least one object in the play area.

In some embodiments, the method 400 may include (not shown in FIG. 4) also receiving, by the processing unit, color data of the object and metadata of the object from both the first tracking module 110 and the second tracking module 120.

In block 460, the method 400 may include continuously tracking, by the processing unit 130 and based at least on one of the first coordinates and the second coordinates, the at least one object in the play area while the at least one object is within the boundaries of either the first image or the second image.

Figure 5:
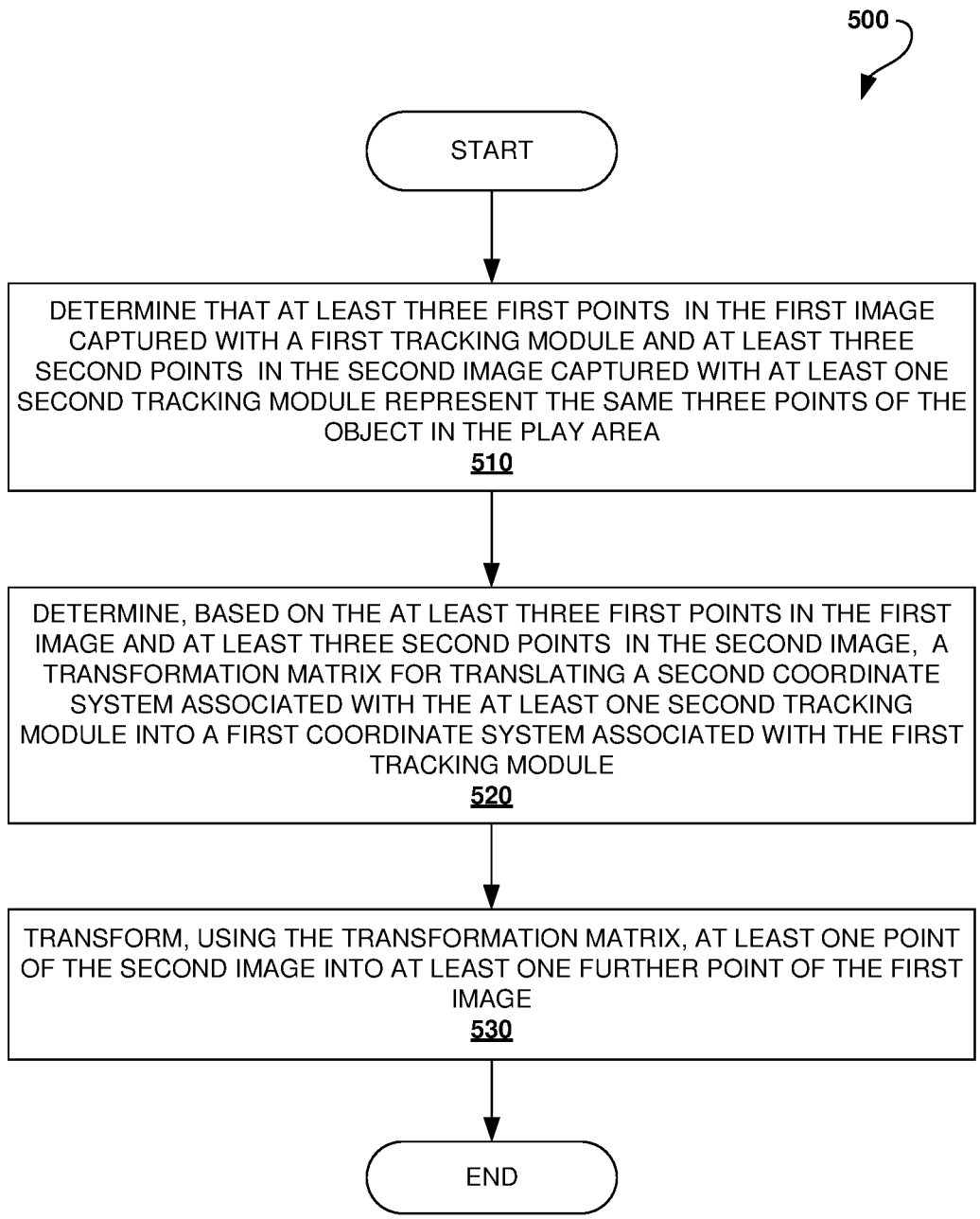
FIG. 5 is a flow chart showing a method for modular virtual reality tracking, in accordance with some embodiments of the disclosure.

FIG. 5 is a flow chart showing a method 500 for modular virtual reality tracking, in accordance with some embodiments of the disclosure. The method 500 can be implemented by elements of system 100 shown in FIG. 1. The method 500 may be used to couple the first tracking module 110 and the second tracking module 120 the first time the modules communicate to the processing unit 130.

As shown in FIG. 5, the method 500 may commence in block 510, with determining, by the processing unit 130, that at least three first points in the first image and at least three second points in the second image represent the same three points of an object in the play area. The determination of common points in the first image and the second image can be based on a color of the points, comparison of movement of the points, and location of the points relative to each other.

In block 520, the method 500 may include determining, by the processing unit 130, based on the at least three points in the first image and the three second points in the second image, a transformation matrix for translating coordinates associated with the second tracking module 120 to coordinates associated with the first tracking module 110.

In block 530, the method 500 may include transforming, by the processing unit 130 and using a transformation matrix, at least one point of the second image into a further point of the first image. The coordinates of the point relative to the second tracking module 120 can be translated to coordinates of the point relative to the first tracking module 110 in situations when the first tracking module 110 does not capture the point, but the point is captured by the second tracking module 120.

Figure 6:
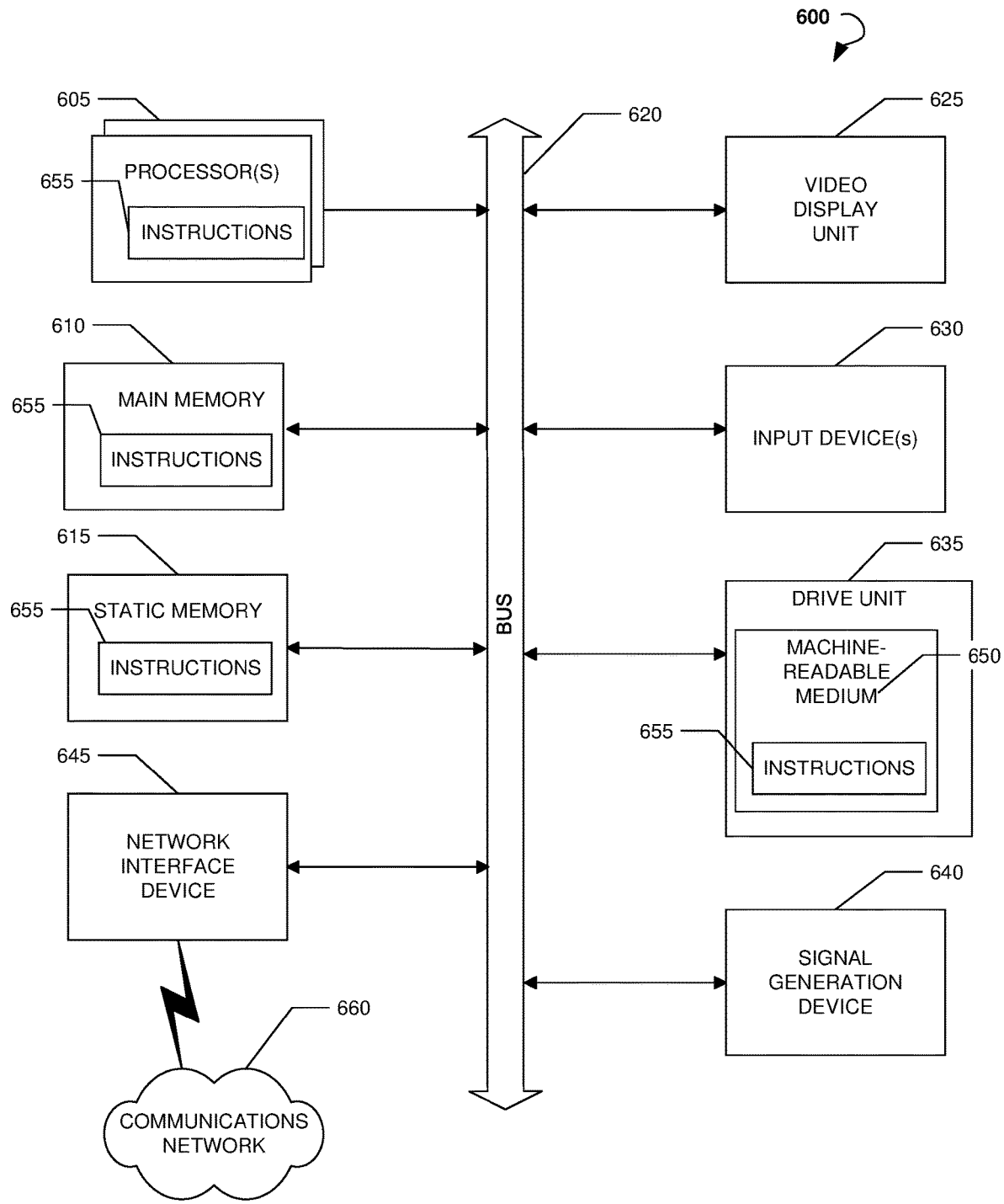
FIG. 6 is a diagrammatic representation of an example machine in the form of a computer system within which a set of instructions for the machine to perform any one or more of the methodologies discussed herein is executed.

FIG. 6 shows a diagrammatic representation of a computing device for a machine in the example electronic form of a computer system 600, within which a set of instructions for causing the machine to perform any one or more of the methodologies discussed herein can be executed. In example embodiments, the machine operates as a standalone device, or can be connected (e.g., networked) to other machines. In a networked deployment, the machine can operate in the capacity of a server, a client machine in a server-client network environment, or as a peer machine in a peer-to-peer (or distributed) network environment. The machine can be a personal computer (PC), tablet PC, set-top box (STB), PDA, cellular telephone, portable music player (e.g., a portable hard drive audio device, such as a Moving Picture Experts Group Audio Layer 3 (MP3) player), web appliance, network router, switch, bridge, or any machine capable of executing a set of instructions (sequential or otherwise) that specify actions to be taken by that machine. Further, while only a single machine is illustrated, the term "machine" shall also be taken to include any collection of machines that separately or jointly execute a set (or multiple sets) of instructions to perform any one or more of the methodologies discussed herein.

The example computer system 600 includes a processor or multiple processors 605 (e.g., a central processing unit (CPU), a graphics processing unit (GPU), or both), and a main memory 610 and a static memory 615, which communicate with each other via a bus 620. The computer system 600 can further include a video display unit 625 (e.g., a LCD or a cathode ray tube (CRT)). The computer system 600 also includes at least one input device 630, such as an alphanumeric input device (e.g., an keyboard), a cursor control device (e.g., a mouse), a microphone, a digital camera, a video camera, and so forth. The computer system 600 also includes a disk drive unit 635, a signal generation device 640 (e.g., a speaker), and a network interface device 645.

The drive unit 635 (also referred to as the disk drive unit 635) includes a machine-readable medium 650 (also referred to as a computer-readable medium 650), which stores one or more sets of instructions and data structures (e.g., instructions 655) embodying or utilized by any one or more of the methodologies or functions described herein. The instructions 655 can also reside, completely or at least partially, within the main memory 610 and/or within the processors 605 during execution thereof by the computer system 600. The main memory 610 and the processor(s) 605 also constitute machine-readable media.

The instructions 655 can further be transmitted or received over a communications network 660 via the network interface device 645 utilizing any one of a number of well-known transfer protocols (e.g., Hyper Text Transfer Protocol (HTTP), CAN, Serial, and Modbus). The communications network 660 includes the Internet, local intranet, Personal Area Network (PAN), Local Area Network (LAN), Wide Area Network (WAN), Metropolitan Area Network (MAN), virtual private network (VPN), storage area network (SAN), frame relay connection, Advanced Intelligent Network (AIN) connection, synchronous optical network (SONET) connection, digital T1, T3, E1 or E3 line, Digital Data Service (DDS) connection, Digital Subscriber Line (DSL) connection, Ethernet connection, Integrated Services Digital Network (ISDN) line, cable modem, Asynchronous Transfer Mode (ATM) connection, or an Fiber Distributed Data Interface (FDDI) or Copper Distributed Data Interface (CDDI) connection. Furthermore, communications also includes links to any of a variety of wireless networks including Wireless Application Protocol (WAP), General Packet Radio Service (GPRS), Global System for Mobile Communication (GSM), Code Division Multiple Access (CDMA) or Time Division Multiple Access (TDMA), cellular phone networks, Global Positioning System (GPS), cellular digital packet data (CDPD), Research in Motion, Limited (RIM) duplex paging network, Bluetooth radio, or an IEEE 802.11-based radio frequency network.

While the machine-readable medium 650 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, flash memory cards, digital video disks, random access memory (RAM), read only memory (ROM), and the like.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, Hypertext Markup Language (HTML), Dynamic HTML, XML, Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, C#, .NET, Adobe Flash, Perl, UNIX Shell, Visual Basic or Visual Basic Script, Virtual Reality Markup Language (VRML), ColdFusion™ or other compilers, assemblers, interpreters, or other computer languages or platforms.

Thus, the technology for modular virtual reality tracking is disclosed. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A system comprising:
 a first tracking module having an image sensor, the first tracking module being configured to:
  capture, using the image sensor located at a first place, a first image of a play area, the play area including at least one object; and
  analyze the first image to obtain first coordinates of the at least one object,
  wherein the first coordinates are associated with the first place;
 at least one second tracking module having at least one other image sensor, the at least one second tracking module being configured to:

capture, using the at least one other image sensor located at a second place, a second image of the play area, wherein the second place differs from the first place; and analyze the second image to obtain second coordinates of the at least one object, wherein the second coordinates are associated with the second place; and a processing unit communicatively coupled to at least part of the first tracking module and at least part of the at least one second tracking module, the processing unit being configured to:

receive, simultaneously in real time from the first tracking module and the second tracking module respectively, at least the first coordinates and the second coordinates; and continuously track, based at least on one of the first and the second coordinates, the at least one object in the play area while the at least one object is within boundaries of at least one of the first image or the second image.

2. The system of claim 1, wherein the processing unit is further configured to determine, based on at least on the first coordinates and the second coordinates, a location and an orientation of the at least one second tracking module relative to the first tracking module.

3. The system of claim 1, wherein the processing unit is further configured to determine, based at least on the first coordinates and the second coordinates, a transformation matrix for translating the second coordinates into the first coordinates.

4. The system of claim 3, wherein the processing unit is further configured to transform at least one point of the second image into at least one point of the first image using the transformation matrix.

5. The system of claim 3, wherein the processing unit is further configured to:

determine that at least three first points (A1, A2, A3) in the first image and at least three second points (B1, B2, B3) in the second image represent the same three points of the at least one object in the play area;

associate an identity matrix with the at least one second tracking module; and apply at least one operation to the identity matrix, thereby obtaining the transformation matrix, wherein (B1, B2, B3) are translated to (A1, A2, A3) using the transformation matrix.

6. The system of claim 5, wherein the at least one operation includes:

a translation to align B1 to A1;

a first rotation around B1 to align B2 to A2; and a second rotation around an axis between B1 and B2 to align B3 to A3.

7. The system of claim 5, wherein the determination that (A1, A2, A3) and (B1, B2, B3) represent the same three points of the at least one object is based on matching colors of the at least three first points and the at least three second points.

8. The system of claim 5, wherein the determination that (A1, A2, A3) and (B1, B2, B3) represent the same three points of the at least one object is based on matching movements of the at least three first points and the at least three second points.

9. The system of claim 5, wherein the determination that (A1, A2, A3) and (B1, B2, B3) represent the same three points of the at least one object is based on matching relative positions of the at least three first points and the at least three second points.

10. The system of claim 1, wherein one of the first tracking module and the at least one second tracking module includes a game console, a smart phone, a tablet computer, a desktop computer, a laptop computer, or a handheld gaming device.

11. A method for tracking an object in a play area, the method comprising:

capturing, by a first tracking module having an image sensor, a first image of the play area, wherein the image sensor is located at a first place;

analyzing, by the first tracking module, the first image to obtain first coordinates of the object, wherein the first coordinates are associated with the first place;

capturing, by at least one second tracking module having at least one other image sensor, a second image of the play area, wherein the at least one other image sensor is located at a second place, the second place being different from the first place;

analyzing, by the at least one second tracking module, the second image to obtain second coordinates of the object, wherein the second coordinates are associated with the second place;

receiving simultaneously in real time from the first tracking module and the second tracking module respectively, by a processing unit communicatively coupled to at least part of the first tracking module and at least part of the at least one second tracking module, at least the first coordinates and the second coordinates; and continuously tracking, by the processing unit and based at least on one of the first coordinates and the second coordinates, the object in the play area while the object is within boundaries of at least one of the first image or the second image.

12. The method of claim 11, further comprising determining, by the processing unit and based at least on the first coordinates and the second coordinates, a position and an orientation of the at least one second tracking module relative to the first tracking module.

13. The method of claim 11, further comprising determining, by the processing unit and based at least on the first coordinates and the second coordinates, a transformation matrix for translating the second coordinates to the first coordinates.

14. The method of claim 13, further comprising transforming, by the processing unit and using the transformation matrix, at least one point of the second image into at least one point of the first image.

15. The method of claim 13, wherein the determining the transformation matrix includes:

determining, by the processing unit, that at least three first points (A1, A2, A3) in the first image and at least three second points (B1, B2, B3) in the second image represent the same three points of the object in the play area;

associating, by the processing unit, an identity matrix with the at least one second tracking module; and applying at least one operation to the identity matrix, thereby obtaining the transformation matrix, wherein (B1, B2, B3) are translated to (A1, A2, A3) using the transformation matrix.

16. The method of claim 15, wherein the at least one operation includes:

a translation to align B1 to A1;

a first rotation around B1 to align B2 to A2; and a second rotation around an axis between B1 and B2 to align B3 to A3.

17. The method of claim 15, wherein the determination that (A1, A2, A3) and (B1, B2, B3) represent the same three points of the object is based on matching a color of the at least three first points and the at least three second points.

18. The method of claim 15, wherein the determination that (A1, A2, A3) and (B1, B2, B3) represent the same three points of the object is based on matching movement of the at least three first points and the at least three second points.

19. The method of claim 15, wherein the determination that (A1, A2, A3) and (B1, B2, B3) represent the same three points of the object is based on matching relative positions of the at least three first points and the at least three second points.

20. A system for tracking an object in a play area, the system comprising:
   a first tracking module having an image sensor, the first tracking module being configured to:
      capture, using the image sensor located at a first place, a first image of the play area; and
      analyze the first image to obtain first coordinates of the object, wherein the first coordinates are associated with the first place;
   at least one second tracking module having at least one other image sensor, the at least one second tracking module being configured to:
      capture, using the at least one other image sensor located at a second place, a second image of the play area, wherein the second place differs from the first place; and
      analyze the second image to obtain second coordinates of the object, wherein the second coordinates are associated with the second place; and
   a processing unit communicatively coupled to at least part of the first tracking module and at least part of the at least one second tracking module, the processing unit being configured to:
      receive, simultaneously in real time, at least the first and the second coordinates;
      determine, based at least on the received first coordinates, and the second coordinates, that at least three first points in the first image and at least three second points in the second image represent the same at least three points of the object;
      determine, based on the at least three first points and the at least three second points, a transformation matrix for translating the second coordinates to the first coordinates; and
      continuously track, based at least on one of the first coordinates and the second coordinates, the object in the play area, and while tracking the object:
         determining that the object leaves boundaries of the first image and the object is within the at least one second image; and
         if the object leaves boundaries of the first image, determining object coordinates of the object relative to the at least one second tracking module and translating, using the transformation matrix, the object coordinates to further object coordinates relative to the first tracking module.

\* \* \* \* \*